United States Patent [19]

Kunkle

[11] Patent Number: 4,460,154
[45] Date of Patent: Jul. 17, 1984

[54] MANUALLY OPERABLE OVERRIDE FOR USE WITH A LINEAR ACTUATOR

[75] Inventor: Calvin S. Kunkle, Tipton, Ind.
[73] Assignee: FMC Corporation, Chicago, Ill.
[21] Appl. No.: 325,087
[22] Filed: Nov. 25, 1981
[51] Int. Cl.³ ............... F16K 31/05; F16K 31/04; F16K 31/44
[52] U.S. Cl. ............... 251/130; 251/14; 251/134; 74/625
[58] Field of Search ............ 251/264, 130, 14, 293, 251/291, 289, 290; 74/625, 424.8 VA, 424.8 R; 308/4 R; 411/513; 384/275

[56] References Cited

U.S. PATENT DOCUMENTS

| | | | |
|---|---|---|---|
| 582,557 | 5/1897 | Stevesonson | 251/264 |
| 766,093 | 7/1904 | Albrand | 308/4 R |
| 1,181,701 | 5/1916 | Van Der Velde | 74/424.8 R |
| 1,952,046 | 3/1934 | Curtis | 74/424.8 R |

Primary Examiner—Martin P. Schwadron
Assistant Examiner—John Starsiak, Jr.
Attorney, Agent, or Firm—Douglas W. Rudy; Richard B. Megley

[57] ABSTRACT

A mechanical override is provided for use with electromechanical linear actuators used in the control of lever operated valves. A pair of telescoping tubes are supported in a fixed relationship to the valve. One tube provides a mounting location for the linear actuator while the other tube is stationary. A lead screw will be manually rotated to move one tube relative to the other. The linear actuator will travel with the moving tube to adjust the valve position.

7 Claims, 8 Drawing Figures

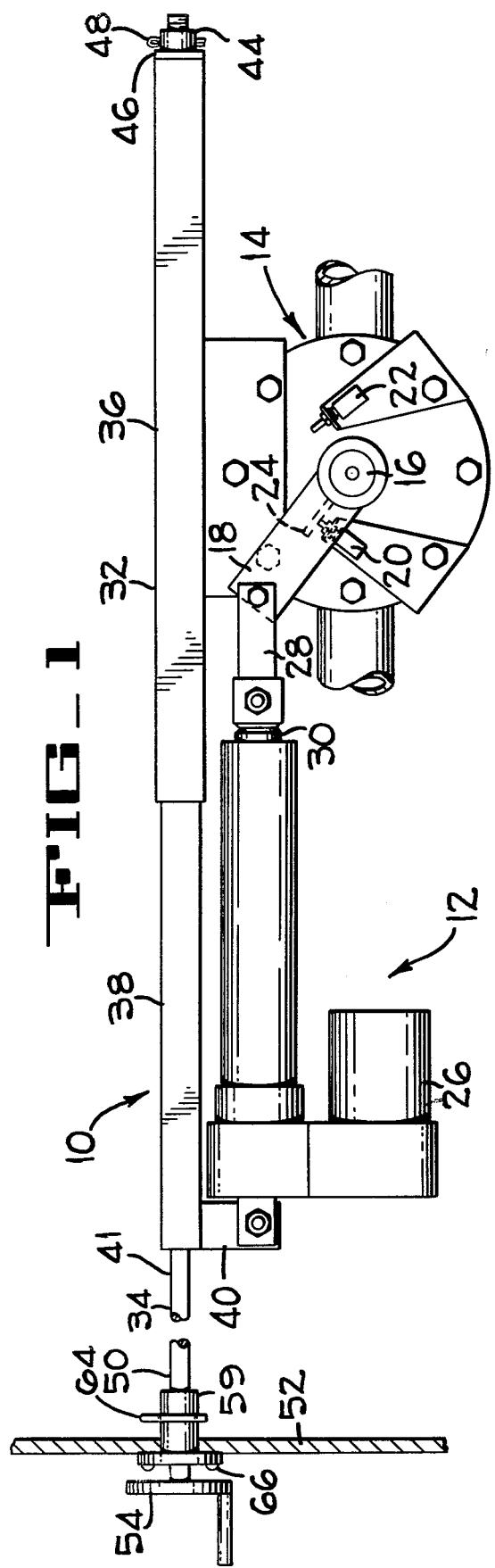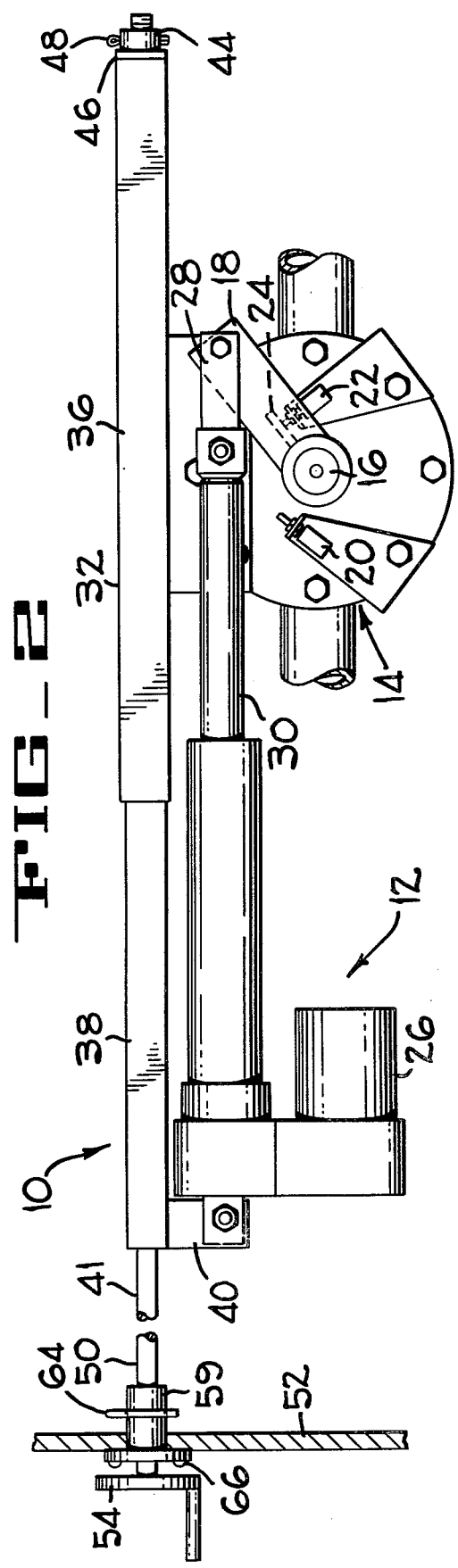

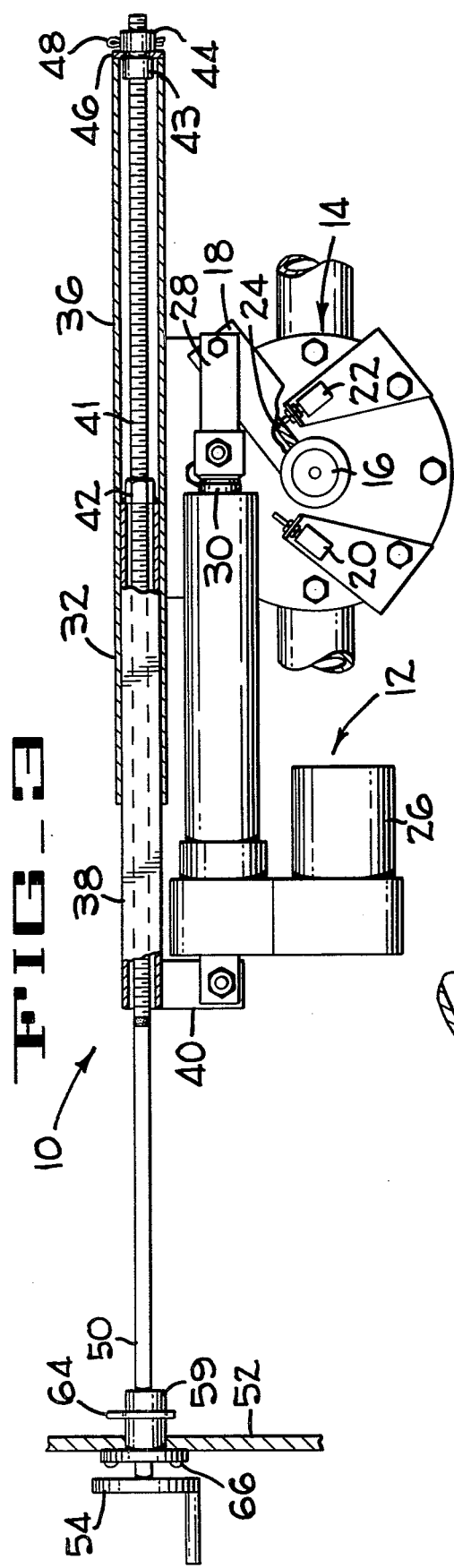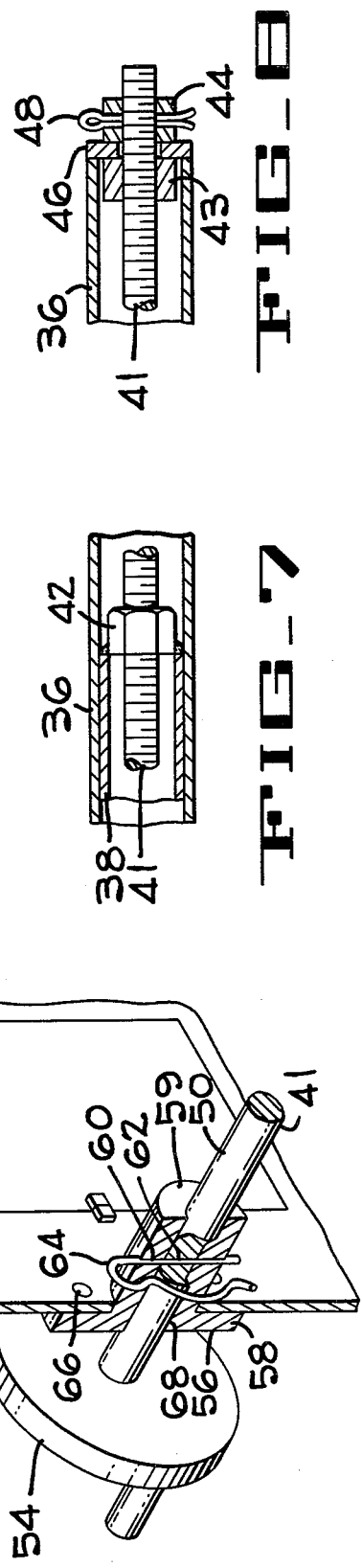

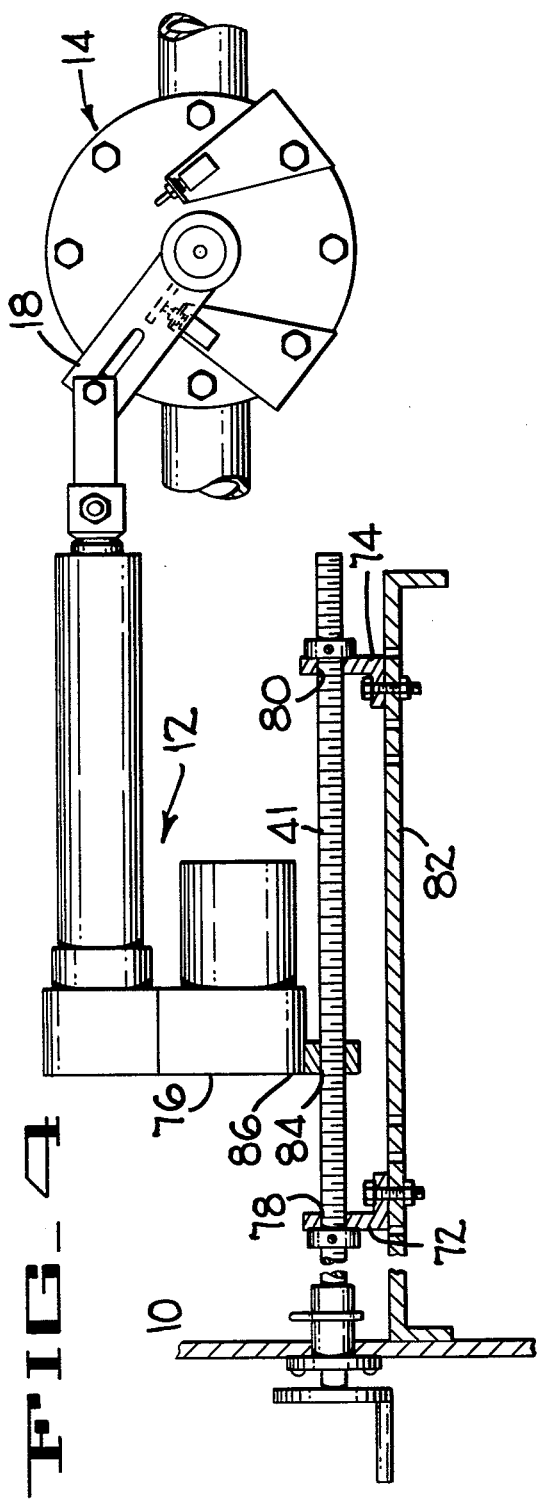
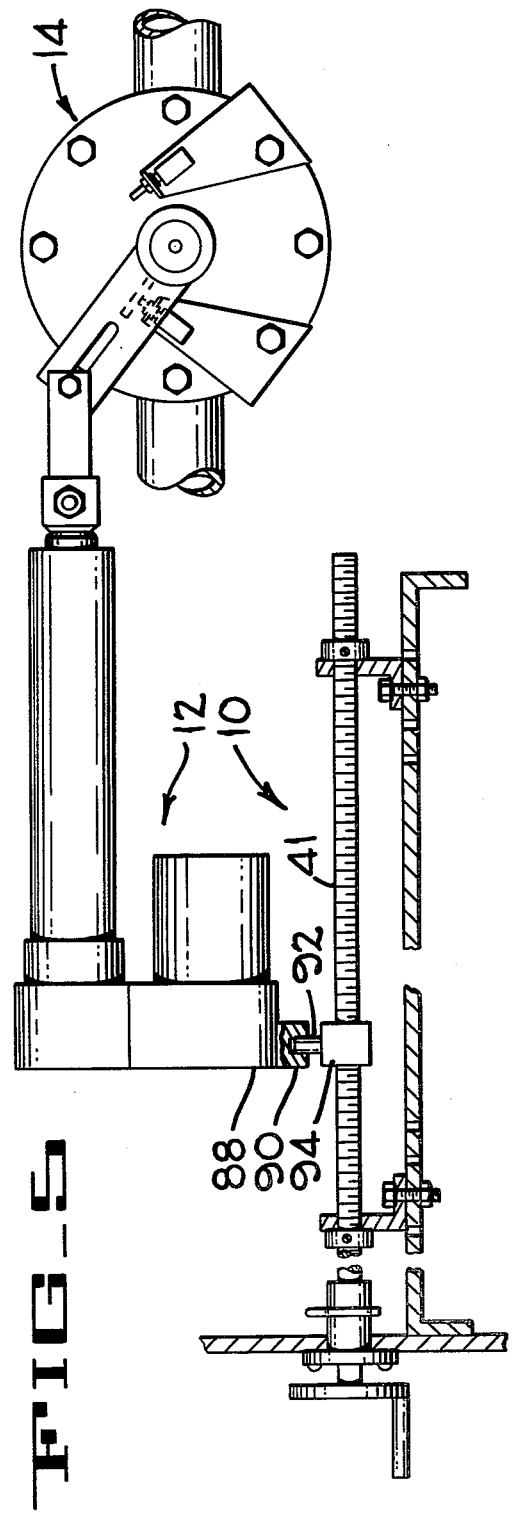

MANUALLY OPERABLE OVERRIDE FOR USE WITH A LINEAR ACTUATOR

BACKGROUND OF THE INVENTION

This invention deals with linear actuator systems controlling valves. Specifically a manual backup system is provided to allow operation of an associated valve by an operator at his discretion.

Electromechanical linear actuators are known for use in the control of lever operated valves. A typical installation would be in a fire truck where a plurality of electromechanical linear actuators may be used to open, feather or close valves. On a fire truck a typical installation could use the linear actuator to control a manifold transfer valve which is a two-position valve that is operated between a "pressure" setting and "volume" setting. The "volume" setting is used when delivery of a large volume of water is desired while the "pressure" setting is used when high pressure is needed to provide a more powerful stream of water. The fire truck operator is provided with an electrical switch mounted in the console and moved to the "pressure" or "volume" setting. Upon actuating the switch the electromechanical actuator extends or retracts depending on the requirement thereby moving the valve control lever. If the electromechanical linear actuator fails to move the valve a manual override actuator is desirable. The invention described herein provides a backup to the electromechanical actuator. The invention is designed to shift the linear actuator as a unit to the desired position of the valve.

Fire trucks have several elements that may use the electromechanical linear actuator including; the manifold transfer valve pump mentioned above, the hose supplying water control valves, and a pump shift control that shifts the fire trucks' engine drive from the wheels to the pump. The manifold transfer pump valve and the pump shift are critical to the trucks' pump function, hence manual override of their electromechanical linear actuators are preferred.

SUMMARY OF THE INVENTION

A manualy operable device is provided to augment or function in place of an electromechanical linear actuator moving the control lever of a valve or other lever operated device. In one embodiment a telescoping structure is carried on the housing lever to be operated. The telescoping support structure may include first and second elongated tubes having one tube connected solidly to the housing. An electromechanical linear actuator is carried on the second elongated tube such that the position of the linear actuator is responsive to the telescoped position of the telescoping support structure.

A lead screw is housed inside the telescoping support structure and is fastened, to prevent longitudinal movement, to the end of the second tube. A lead screw nut provides the threaded journal that is mounted to the fixed first elongated tube allowing lead screw rotation to affect the length of the telescoping support structure and thus the position of the linear actuator.

A hand crank is affixed to the screw to facilitate its rotation. To prevent unnecessary hand crank rotation the lead screw, or an extension thereof, passes through a guide stop having a pin device to prevent rotation of the screw.

BRIEF DESCRIPTION OF THE DRAWING FIGURES

The essence of this invention will be understood through a perusal of this specification in cooperation with an understanding of the drawing figures wherein:

FIG. 1 is a front elevation view of an electromechanical linear actuator and the manual override control of the invention;

FIG. 2 is the device of FIG. 1 with the shaft of the electromechanical linear actuator extended to a displaced position;

FIG. 3 is the device of FIG. 1 with a manual override telescoped to an retracted position;

FIG. 4 is an alternative embodiment with a modified electromechanical linear actuator;

FIG. 5 is another alternative embodiment having a modified electromechanical linear actuator housing;

FIG. 6 is a portion of the guide stop and hand crank rod;

FIG. 7 is a portion of the manual override control sectioned to expose a threaded journal;

FIG. 8 is a portion of the manual override control sectioned to expose thrust collars.

DETAILED DESCRIPTION OF THE INVENTION

The preferred embodiment of the invention is clearly shown by the initial three Figures. In FIG. 1 the manual override control generally 10 is shown supporting the electromechanical linear actuator generally 12 fixedly mounted to the valve housing generally 14.

The valve housing is a representative presentation that could be the manual transfer valve of a pumper type fire truck. The actual valve is not a critical item as the invention could be used on other lever operated valves or position selectors.

Extending out of the valve housing generally 14 is a shaft 16 of the valve to which a lever 18 has been affixed. The lever will be operated through an arc to either open or close the valve or in this case to change the valve from a "pressure" mode to a "volume" delivery mode. A pair of switches 20 and 22 are mounted to the valve housing to interface with an appendage 24 on the lever 18 such that the motor 26 of the linear actuator generally 12 will shut off upon closing of the switch.

The lever 18 is pivotally connected to the operating end 28 of the lead screw member 30. The lead screw member 30 is rotatably driven through a gear drive of the linear actuator from the electric motor 26 in a conventional manner.

The manual override control generally 10 is comprised of a support means 32 to which the linear actuator is attached and a manual control means 34 for operating the support means 32.

The support means 32 comprises a first 36 elongated tube that is fastened to the valve housing. A second 38 elongated tube is carried inside said first elongated tube in a telescoping relationship for longitudinal movement. Both tubes are shown to be rectangular in cross-section but could be non-rectangular for certain embodiments.

The second tube 38 is provided with a mounting bracket 40 at its outboard end to which the linear actuator generally 12 is attached. A threaded journal 42 (FIG. 7) is axially located with respect to the second tube 38 at the inboard end thereof. FIG. 7 shows a nut welded to the second tube to act as the threaded journal.

A rod means 41 having a threaded portion is carried longitudinally inside the first 36 and second 38 elongated tubes and is rotatably secured to an outboard end of the first tube 36. See FIG. 8. Inboard thrust collar 43 and an outboard thrust collar 44 locate rod means 41 with respect to an apertured end plate 46. Key or cotter pin 48 may be provided to restrain the outboard thrust collar 44.

The rod means 41 may have an unthreaded extended portion 50 that projects through a panel 52, for instance of a fire truck body, to terminate in a rod rotating means such as a hand crank 54.

Referring to FIG. 6 a guide stop 56 is shown comprising a guide stop flange portion 58 attached to and supporting a tube portion 59 accompanies the extended portion 50 of the rod means 41. The tube 59 is provided with a transverse aperture 60 extending typically through both walls of the tube 59 (which defines a longitudinal bore) and aligned with a transverse aperture 62 of comparable diameter in the rod means to accommodate a pin means 64. Guide stop flange portion 58 is provided with a plurality of apertures including mounting apertures such as 66 (shown accommodating a fastener) and a rod accommodating aperture 68. With the guide stop secured to a stationary object such as the panel 52 the pin means 64 will prevent relative rotation of the rod means 41 in the guide stop tube 59. This will deter undesirable movement of the linear actuator by preventing the telescoping of the second tube 38 in the first tube 36.

In operation the lever 18 of the valve will be moved by the electromechanical linear actuator 12 on command of the human operator activating a switch (not shown). Compare FIGS. 1 and 2. The electric motor 26 turns the screw 30 and the operating end 28 of the linear actuator will displace the lever 18 to the desired position. If the lever actuator fails to function properly then the human operator will reach through access panel 63 and remove the pin means 64 and turn the hand crank 54 causing rotation of the threaded rod means 41. See FIG. 3. The threaded rod means 41 will drive the second elongated tube 38 either into or out of the first elongated tube depending on the direction of crank rotation. The electromechanical linear actuator will be moved in its entirety with the second elongated tube to operate the valve means through its lever 18.

Alternative embodiments are provided in FIGS. 4 and 5. FIG. 4 shows a pair of upwardly projecting uprights 72 and 74 comprising the support means for the modified electromechanical linear actuator 76. Each upright is fixed in a longitudinally spaced apart relationship and each has a through bore 78 and 80 respectively, for journalling the rod means 41. Each upright will be securely mounted to a grounded component, one of which may be the pump valve body. The uprights could be connected together through a bridging element 82 or mounted to disassociated elements.

Modified electromechanial linear actuator 76, FIG. 4, is provided with a threaded aperture 84 formed in the housing 86. This threaded aperture is compatible with the rod means 41 thread such that as the rod means is rotated, as in the preferred embodiment, the housing will travel laterally to move the lever 18 to the desired location. Of course, this is the manual override mode of operation with the above described electromechanical operation being the norm.

FIG. 5 shows a variation of the FIG. 4 embodiment with another modification of the linear actuator housing 88. This housing has been equipped with a probe receiving appendage 90 that will interface with a probe 92 extending from a threaded traveller 94. Threaded traveller 94 will move laterally on the lead screw or rod means 41 to urge the modified electromechanical linear actuator in the desired direction. Operation is as explained above in other respects.

Thus, it can be shown that there has been provided a manual override for use with an electromechanical linear actuator that satisfies the object of this invention. The inventor contemplates that nuances of design are to be covered by broad scope of the appended claims.

I claim:

1. An operating mechanism for use in controlling a valve means through the positioning of an operating lever attached to said valve means to move said operating lever from one operative position to another and to restrain said operating lever in one of said positions comprising:

a linear actuator means having a motor and a lead screw member positionably connected to said operating lever of said valve means;

a telescoping support means having a first elongated tube mounted to said valve means and a second elongated tube connected for telescoping movement with said first elongated tube, said second elongated tube carrying said linear actuator means;

manual control means including a rod having a threaded portion carried longitudinally inside said first and said second elongated tubes rotatably secured to an outboard end of said first elongated tube and rotatably supported in a threaded journal fixedly attached to said second elongated tube, said rod provided with a transverse aperture;

a guide stop flange having a tube provided with a pair of aligned transverse apertures aligned with said transverse aperture of said rod;

pin means insertable through said aligned apertures of said rod and said guide stop flange tube whereby said rod will be restrained from rotational movement when said pin means is inserted in said aligned apertures.

2. A manually operable control means for controlling a valve means operably connected to an electromechanical linear actuator, said manually operable control means comprising;

a telescoping support means carried on said valve means having a first elongated tube mounted to said valve means and a second elongated tube carried in said first elongated tube for telescoping longitudinal movement therewith, said electromechanical linear actuator carried on said second elongated tube;

manual control means including a rod having a threaded portion carried inside said first and said second elongated tubes, said rod supportedly fixed for rotation in said first elongated tube and supported in a threaded journal carried in said second elongated tube;

said rod further supported in a guide stop flange being a flange having a plurality of apertures including mounting apertures and a rod accommodating aperture and a tube having a longitudinal bore defined by said tube, said tube provided with a pair of aligned transverse apertures;

means associated with said rod to cause rotation thereof.

3. The invention in accordance with claim 2 wherein said rod is provided with a transverse aperture aligned with said pair of aligned transverse apertures of said tube and said guide stop flange.

4. The invention in accordance with claim 3 wherein a locking pin is provided through said apertures of said tube and said rod preventing rod rotation.

5. A manually operable control means for controlling a value means operably connected to an electromechanical linear actuator, said manually operable control means comprising:
- a telescoping support means having at least a first and a second elongated tube for telescoping movement relative therethrough, said telescoping support means supporting said electromechanical linear actuator on one of said elongated tubes having another of said elongated tubes restrained relative to said valve means;
- a rod having a threaded portion carried inside said telescoping support means for causing telescoping of said telescoping support means when rotated, said rod having an aperture therethrough;
- a guide stop flange having a tube provided with aligned apertures therethrough, said aligned apertures alignable with said aperture through said rod;
- pin means insertable through said aligned apertures of said tube and said aperture of said rod whereby said rod will be restrained from rotation and thus prevent telescoping of said telescoping support means.

6. A manually operable control means for controlling a valve means operably connected to an electromechanical linear actuator, said manually operable control means comprising;
- threaded rod means supported by uprights having rod means receiving through bores for journaling said rod means, said rod means having a transverse aperture;
- a threaded aperture formed in the housing of said electromechanical linear actuator to accept said rod means;
- a guide stop flange, supporting one end of said rod means, said guide stop flange having a plurality of apertures including mounting apertures and a rod accomodating aperture and a tube having a longitudinal bore provided with a pair of aligned transverse apertures aligned with said transverse aperture of said rod means;
- pin means insertable through said pair of aligned transverse apertures of said tube and through said transverse aperture of said rod means for preventing relative movement between said rod means and said guide stop flange tube.

7. The invention in accordance with claim 3 wherein said housing of said electromechanical linear actuator is provided with a removable portion having said threaded aperture whereby said linear actuator may be removed from said threaded rod means by separating said linear actuator from said removable portion which will remain in contact with said threaded rod means.

* * * * *